(12) United States Patent
Bumiller

(10) Patent No.: US 7,986,943 B2
(45) Date of Patent: *Jul. 26, 2011

(54) ELECTRONIC FILE TRANSFER FOR A COMMUNICATIONS DEVICE

(75) Inventor: George Baldwin Bumiller, Ramsey, NJ (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/875,405

(22) Filed: Sep. 3, 2010

(65) Prior Publication Data

US 2010/0332620 A1 Dec. 30, 2010

Related U.S. Application Data

(63) Continuation of application No. 11/459,242, filed on Jul. 21, 2006, now Pat. No. 7,809,356.

(30) Foreign Application Priority Data

Jul. 20, 2006 (EP) ................................ 06117575

(51) Int. Cl.
*H04M 1/725* (2006.01)

(52) U.S. Cl. ............... 455/412.1; 455/412.2; 455/414.1; 455/466; 709/206

(58) Field of Classification Search .... 455/412.1–412.2, 455/414.1–414.3, 466; 709/203–206
See application file for complete search history.

(56) References Cited

U.S. PATENT DOCUMENTS

| | | | |
|---|---|---|---|
| 5,426,594 A | 6/1995 | Wright et al. | |
| 5,436,960 A | 7/1995 | Campana et al. | |
| 5,771,355 A * | 6/1998 | Kuzma | 709/232 |
| 5,781,901 A * | 7/1998 | Kuzma | 1/1 |
| 5,903,723 A * | 5/1999 | Beck et al. | 709/200 |
| 6,212,550 B1 | 4/2001 | Segur | |
| 6,327,612 B1 * | 12/2001 | Watanabe | 709/206 |
| 6,411,685 B1 | 6/2002 | O'Neal | |
| 6,636,733 B1 | 10/2003 | Helferich | |
| 6,947,738 B2 | 9/2005 | Skog et al. | |
| 7,454,195 B2 | 11/2008 | Lewis et al. | |
| 7,539,291 B2 | 5/2009 | D'Angelo et al. | |
| 7,584,251 B2 * | 9/2009 | Brown et al. | 709/206 |
| 7,711,835 B2 | 5/2010 | Braddy et al. | |
| 7,809,356 B2 * | 10/2010 | Bumiller | 455/412.1 |
| 7,881,444 B2 * | 2/2011 | Gogic | 379/88.23 |
| 2002/0055350 A1 | 5/2002 | Gupte et al. | |
| 2003/0050933 A1 | 3/2003 | DeSalvo | |
| 2004/0203947 A1 | 10/2004 | Moles | |
| 2007/0038703 A1 * | 2/2007 | Tendjoukian et al. | 709/206 |

(Continued)

OTHER PUBLICATIONS

2004 Open Mobile Alliance Ltd., "Mobile Email Requirements" Sep. 2005, pp. 1-55.

(Continued)

*Primary Examiner* — Shrad Rampuria
(74) *Attorney, Agent, or Firm* — Novak Druce & Quigg LLP

(57) ABSTRACT

Systems and methods are provided for identifying an electronic file that is accessible by a communications node to be transmitted to a recipient. A communications device sends an identification of the electronic file. The communications node receives the identification of the electronic file, identifies the electronic file based on the identification, and accesses the electronic file for transmission to the recipient. The electronic file is not transmitted from the communications device to the communications node.

20 Claims, 13 Drawing Sheets

U.S. PATENT DOCUMENTS

2008/0046530 A1    2/2008    Lazaridis et al.

OTHER PUBLICATIONS

2006 Citrix Online, LLC, "Citrix GoToMyPC Corporate—Product Overview", pp. 1-4.

2004 Citrix Online, LLC, "Citrix GoToMyPC Corporate Technology—Making Life Simpler for Remote and Mobile Workers", pp. 1-5.

1997-2006 Citrix Online, LLC, "GoToMyPC Corporate—How It Works", pp. 1-3, Retrieved on May 5, 2006 from https://www.gotomypc.com/corp/HowItWorks.tmpl?/SessionInfo=97263757:C36760F34E563EE.

1997-2006 Citrix Online, LLC, "GoToMyPC Corporate—Features", pp. 1-3, Retrieved on May 5, 2006 from https://www.gotomypc.com/corp/features.tmpl?SessionInfo=97263757:C36760F34E536EE.

Office Action dated Aug. 31, 2010 from corresponding Canadian Patent Application No. 2,592,572.

\* cited by examiner

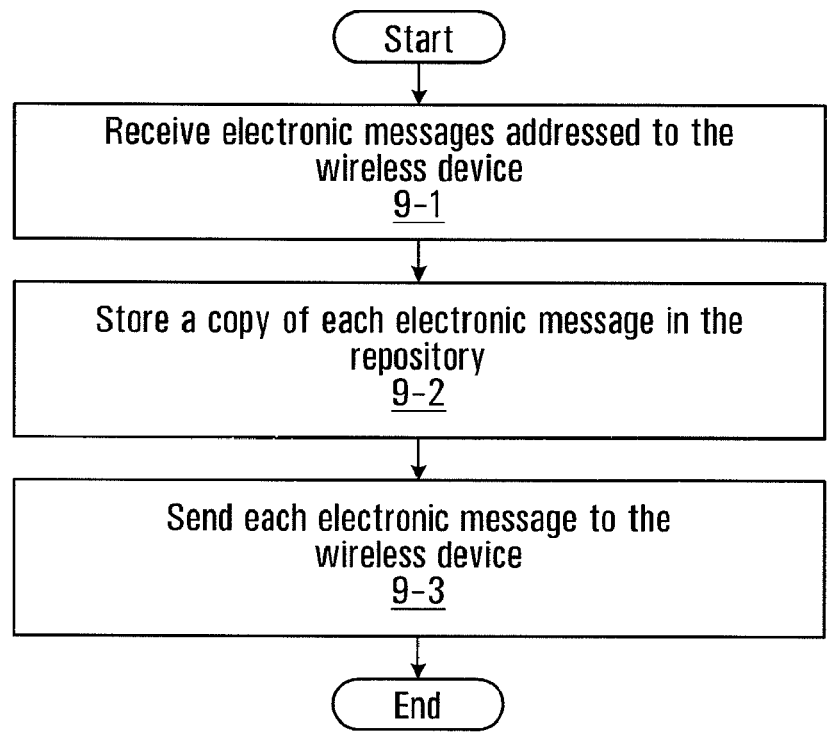
FIG. 9
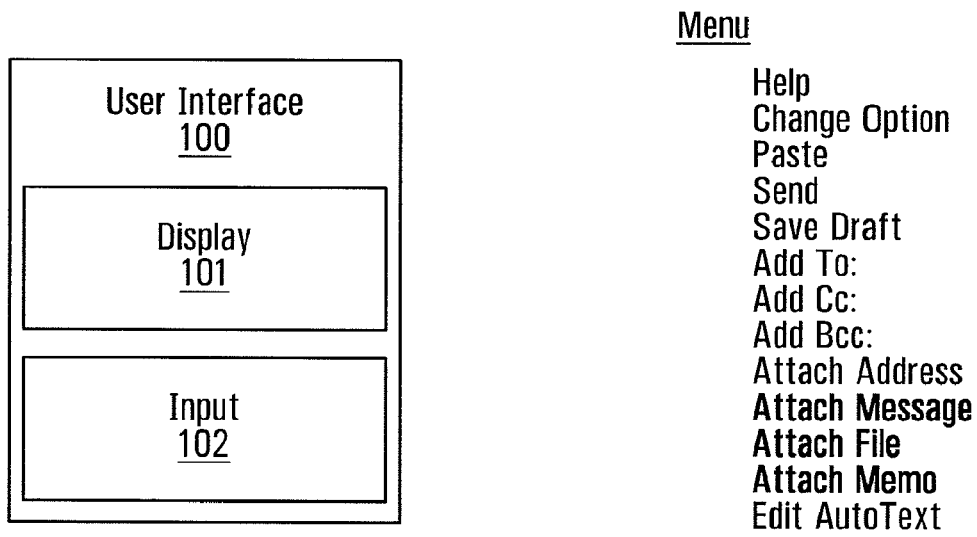
FIG. 10
FIG. 11

| Name | Type | Source | Public | Date | Note |
|---|---|---|---|---|---|
| | | | Y/N | YYMMDD | |
| Ann_rpt_06 | doc | folder | Y | 060415 | |
| Ann_rpt_06 | pdf | folder | Y | 060415 | |
| board_members | jpg | EM-joe | Y | 051205 | |
| 22060-6_draft | doc | I'net | Y | 060512 | new spec |
| products | ppt | folder | Y | 060610 | |
| widget-1 | jpg | EM-john | N | 060508 | first version |
| new_product | pdf | EM-sam | N | 060509 | very sensitive |
| conferenceselect | htm | I'net | Y | 060612 | IEEE 802 conf |
| new products | msg | EM-sam | N | 060612 | |

FIG. 12

ELECTRONIC FILE TRANSFER FOR A COMMUNICATIONS DEVICE

RELATED APPLICATION

This application claims the benefit of previously filed European Application No. 06117575.8 filed Jul. 20, 2006 hereby incorporated by reference in its entirety.

This application is a continuation of previously filed U.S. application Ser. No. 11/459,242 filed Jul. 21, 2006 now U.S. Pat. No. 7,809,356 hereby incorporated by reference in its entirety.

FIELD OF THE APPLICATION

This application relates to communication systems, and more particularly to electronic messaging for communications devices.

BACKGROUND

Communications devices capable of sending and receiving electronic messages such as email messages are used by many. A user may attach an electronic file to an email message so that the electronic file may be sent with the email message. The electronic file may be a text file, a video file, or any other file. Some electronic files are quite large. Transmitting large electronic files to and from a communications device such as a wireless device can be problematic because the available data communication bandwidth to and from the communications device is limited. Transmitting data to and from the communications device occupies time and valuable bandwidth. Furthermore, if the communications device is battery powered then strain is placed on the battery during a data transmission.

BRIEF DESCRIPTION OF THE DRAWINGS

Preferred embodiments will now be described with reference to the attached drawings in which:

FIG. 9 is a flowchart of an example method of transmitting electronic messages;

FIG. 10 is a schematic of an example user interface of a wireless device;

FIG. 11 is a schematic of an example menu selection that may be displayed by the user interface of FIG. 10;

FIG. 12 is a schematic of an example table of electronic files that may be displayed by the user interface of FIG. 10;

DETAILED DESCRIPTION OF THE PREFERRED EMBODIMENTS

Figure 1:
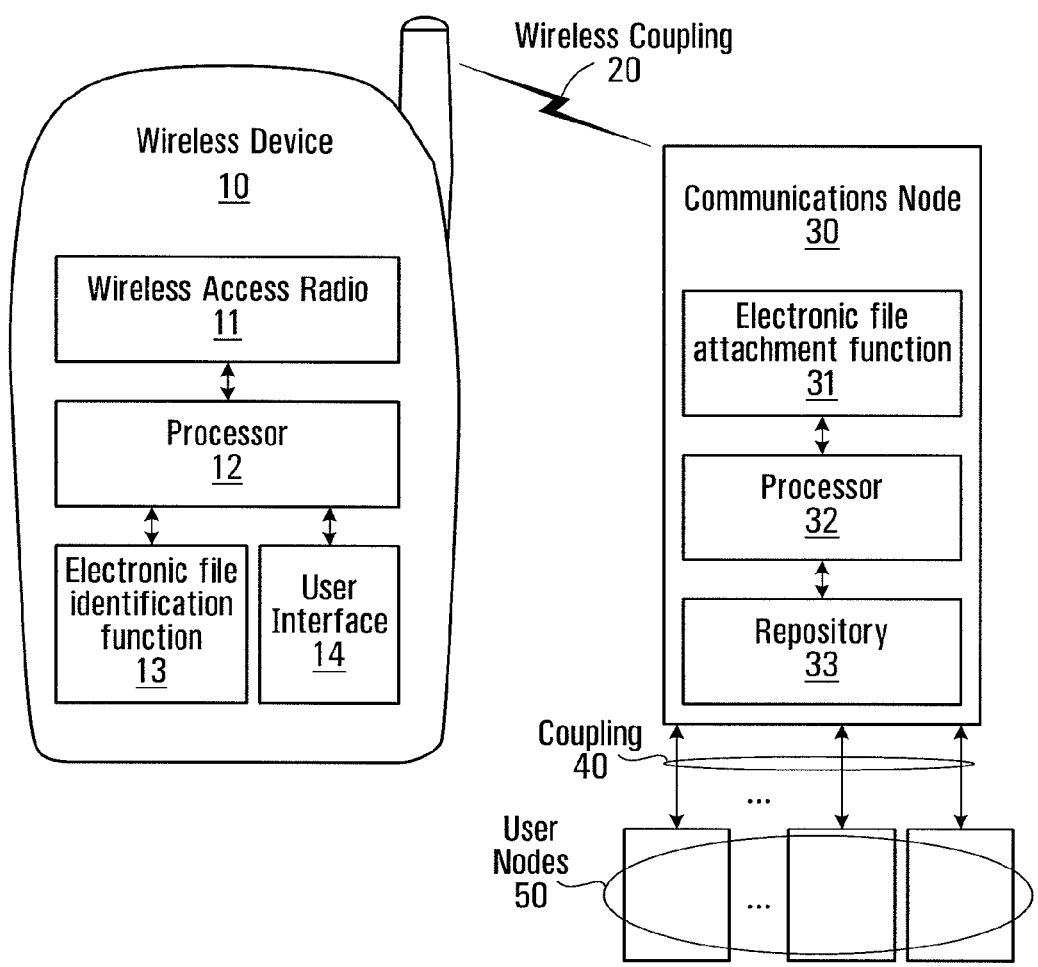
FIG. 1 is a schematic of an example network having a wireless device coupled to a communications node.

According to a broad aspect, there is provided a method in a communications device, the communications device being in communication with a communications node, the method comprising: accepting user input for selecting at least one electronic file accessible by the communications node to be attached to a new electronic message being composed; and sending the new electronic message and an identification of the at least one electronic file, the identification enabling the communications node to identify and attach the at least one electronic file to the new electronic message.

In some embodiments, the new electronic message is selected from a group consisting of: an email message, an attachment-enabled PIN message, and a multimedia messaging system (MMS) message.

In some embodiments, the method further comprises: sending the identification as part of the new electronic message.

In some embodiments, the method further comprises: maintaining a copy of the at least one electronic file on the communications device; and synchronising the copy of the at least one electronic file with the at least one electronic file accessible by the communications node.

In some embodiments, the at least one electronic file comprises an electronic file stored in a repository that is accessible by the communications node.

In some embodiments, the repository comprises at least one of: an electronic message application folder, a shared directory of an enterprise network, and an Internet.

In some embodiments, the repository comprises a first location and a second location, the method further comprising: transmitting a request to the communications node to copy an electronic file from the first location to the second location.

In some embodiments, the identification of the at least one electronic file comprises an identifier for identifying the repository and for identifying the at least one electronic file.

In some embodiments, the method further comprises: generating a message identifier based on attributes of the user-selected electronic message; and using the message identifier in the identification of the at least one electronic file.

In some embodiments, the method further comprises: generating an identifier based on attributes of the user-selected attachment; and using the identifier in the identification of the at least one electronic file.

In some embodiments, the at least one electronic file comprises at least a portion of a memo file.

In some embodiments, the identification of the at least one electronic file comprises a memo identifier for identifying the memo file and the portion of the memo file.

In some embodiments, the at least one electronic file comprises an electronic file of an Internet.

In some embodiments, the at least one electronic file comprises a web page.

In some embodiments, the identification of the at least one electronic file comprises a web identifier for identifying the web page.

In some embodiments, the at least one electronic file comprises an electronic file accessible from an enterprise network.

In some embodiments, the identification of the at least one electronic file comprises a network file identifier for identifying the electronic file accessible from the enterprise network.

In some embodiments, the communications device is selected from a group consisting of a wireless device, and a wired device.

In some embodiments, the method further comprises: maintaining a table of electronic files, the table of electronic files identifying a plurality of electronic files that are accessible by the communications node for attachment to the new electronic message being composed.

In some embodiments, the method further comprises: receiving electronic files; and automatically adding an identification of the electronic files into the table of electronic files.

In some embodiments, the method further comprises: automatically removing entries from the table of electronic files after a defined period of time.

In some embodiments, automatically removing entries from the table of electronic files after the defined period of time comprises: accepting user input for auto-ageing and removal of entries from the table of electronic files.

In some embodiments, accepting user input comprises: accepting user input for a multiplicity of retention times, the multiplicity of retention times being selectively applied to entries in the table of electronic files.

According to another broad aspect, there is provided a non-transitory computer readable medium having computer readable instructions stored thereon for execution on a communications device so as to implement the method summarised above.

According to another broad aspect, there is provided a communications device in communication with a communications node, the communications device comprising: a user interface adapted to accept user input for selecting at least one electronic file accessible by the communications node to be attached to a new electronic message being composed; and an electronic file identification function adapted to send the new electronic message and an identification of the at least one electronic file, the identification enabling the communications node to identify and attach the at least one electronic file to the new electronic message.

In some embodiments, the communications device is selected from a group consisting of a wireless device, and a wired device.

According to another broad aspect, there is provided a method in a communications node, the communications node being in communication with a communications device, the method comprising: receiving a new electronic message and an identification of at least one electronic file to be attached to the new electronic message; identifying the at least one electronic file using the identification; attaching the at least one electronic file to the new electronic message; and transmitting the new electronic message to at least one recipient.

In some embodiments, the repository comprises a first location and a second location, the method further comprising: upon receiving a request, copying an electronic file from the first location to the second location.

In some embodiments, the method further comprises: accepting input to selectively prevent or permit enterprise-related attachments to be sent using internet email or non-enterprise instant messaging.

According to another broad aspect, there is provided a non-transitory computer readable medium having computer readable instructions stored thereon for execution on a communications node so as to implement the method summarised above.

According to another broad aspect, there is provided a communications node comprising: an electronic file attachment function adapted to: receive a new electronic message and an identification of at least one electronic file to be attached to the new electronic message; identify the at least one electronic file using the identification; attach the at least one electronic file to the new electronic message; and transmit the new electronic message to at least one recipient.

According to another broad aspect, there is provided a user interface of a communications device, the communications device being in communication with a communications node, the user interface comprising: a display adapted to display an identification of at least one electronic file accessible by the communications node; an input adapted to accept a user selection of the at least one electronic file to be attached to a new electronic message being composed, and to accept a command to send the new electronic message and an identification of the user selection so that the communications node can identify and attach the at least one electronic file to the new electronic message.

In some embodiments, the display is further adapted to present a table of electronic files that are immediately available for use as attachments for the new electronic message.

In some embodiments, the table of electronic files comprises at least one of: a file name attribute indicating file names of the electronic files; a file type attribute indicating file extensions of the electronic files; a file source attribute indicating each of the electronic files as being enterprise-related or internet-related; a file public indication attribute indicating which of the electronic files are public; a file date attribute indicating for each of the electronic files a date selected from a group consisting of: date of the electronic file, date of being acquired, and date category, the date category being selected from a group consisting of today, past week, past month, and past quarter; and a file note attribute indicating sensitivity of enterprise-related electronic files.

According to another broad aspect, there is provided a method in a communications device, the communications device being in communication with a communications node, the method comprising: maintaining a communications session with another communications device; accepting user input for selecting at least one electronic file accessible by the communications node, the at least one electronic file being selected for transmission in the communications session; and sending an identification of the at least one electronic file, the identification enabling the communications node to identify and transmit the at least one electronic file in the communications session.

In some embodiments, the communications session is an Instant Message (IM) session.

According to another broad aspect, there is provided a non-transitory computer readable medium having computer readable instructions stored thereon for execution on a communications device so as to implement the method summarised above.

According to another broad aspect, there is provided a communications device comprising: a communication session function adapted to maintain a communications session with another communications device; a user interface adapted to accept user input for selecting at least one electronic file accessible by the communications node, the at least one electronic file being selected for transmission in the communications session; and an electronic file identification function adapted to send an identification of the at least one electronic file, the identification enabling the communications node to identify and transmit the at least one electronic file in the communications session.

According to another broad aspect, there is provided a method in a communications node, the communications node being in communication with a communications device, the method comprising: receiving an identification of at least one electronic file to be transmitted in a communications session; identifying the at least one electronic file using the identification; and transmitting the at least one electronic file in the communications session.

According to another broad aspect, there is provided a non-transitory computer readable medium having computer readable instructions stored thereon for execution on a communications node so as to implement the method summarised above.

According to another broad aspect, there is provided a communications node comprising: an electronic file transmission function adapted to: receive an identification of at least one electronic file to be transmitted in a communications session; identify the at least one electronic file using the identification; and transmit the at least one electronic file in the communications session.

According to another broad aspect, there is provided a user interface of a communications device, the communications device being in communication with a communications node, the user interface comprising: a display adapted to display an identification of at least one electronic file accessible by the communications node; an input adapted to accept a user selection of the at least one electronic file to be transmitted in a communications session, and to accept a command to send an identification of the user selection so that the communications node can identify and transmit the at least one electronic file in the communications session.

Wireless Device & Communications Node

Referring to FIG. 1, shown is a schematic of an example network having a wireless device 10 coupled to a communications node 30. The wireless device 10 has a wireless access radio 11, a processor 12, an electronic file identification function 13, and a user interface 14. The wireless device 10 is coupled to the communications node 30 via a wireless coupling 20, which in turn is coupled to a plurality of user nodes 50 via coupling 40. The communications node 30 has an electronic file attachment function 31, a processor 32, and a repository 33. The wireless device 10 and the communications node 30 may have other components, but they are not shown for sake of simplicity.

In operation, the wireless device 10 is adapted to communicate with the communications node 30 via the wireless access radio 11 and the wireless coupling 20. Such communication may for example include electronic messages. According to an embodiment of the application, the electronic file identification function 13 allows a user of the wireless device 10 to select and identify an electronic file stored in the repository 33 of the communications node 30 for attachment in a new electronic message. The new electronic message may be sent from the wireless device 10 without sending the electronic file over the wireless coupling 20. Instead, an identification of the electronic file to be attached to the new electronic message is sent. The user may compose the new electronic message, select the electronic file to be attached, and send the new electronic message using the user interface 14.

The electronic file attachment function 31 of the communications node 30 receives the new electronic message and the identification of the electronic file, attaches the electronic file to the new electronic message, and sends the new electronic message with the electronic file attached therein to a recipient. The recipient may for example be one of the user nodes 50.

The operation of the wireless device 10 and the communications node 30 has been described above with reference to a single electronic file. More generally, the user may select a plurality of electronic files to be attached to the new electronic message.

In some implementations, the electronic file identification function 13 and the electronic file attachment function 31 are each implemented as software and are respectively executed on the processors 12,32. More generally, the electronic file identification function 13 and the electronic file attachment function 31 may each be implemented as hardware, software, firmware, or any combination thereof.

There are many possibilities for the repository 33. The repository 33 may be any appropriate data storage means, for example a database, or a storage directory. The repository 33 may include a single data storage means or a plurality of data storage means. The repository 33 may or may not physically reside on the communications node 30. The repository 33 may reside in any location or combination of locations to which the communications node 30 has appropriate access. As a first example, an enterprise network coupled to the communications node may include shared directories for storing electronic files. As a second example, the Internet may be used as a repository so that electronic files of the Internet may be accessed by the communications node. Such electronic files may for example include web pages.

In some implementations, when the repository 33 is distributed over a plurality of locations, the user is provided with the option of copying an electronic file from one location to another. For example, if the repository 33 is composed of both a shared directory of an enterprise network and an electronic message application folder of an electronic message server, then the user may choose to have an electronic file copied from the shared directory to the electronic message application folder. The user may decide to do this, for example, if the communications node can access the file from the electronic message application folder much faster than from the shared directory. This makes the electronic file more accessible for the communications node. In some implementations, the user transmits a request to the communications node to have the electronic file copied from a first location to a second location. Other implementations are possible.

There are many possibilities for the wireless coupling 20. In some implementations, the coupling 20 includes a wireless access network (not shown). In further implementations, the communications node 30 is a part of the wireless access network. In some implementations, the wireless coupling 20 includes one or more wired connections to the communications node 30 in addition to one or more wireless connections.

There are many possibilities for the coupling 40. In some implementations, the coupling 40 includes a wired connection. In some implementations, the coupling 40 includes a wireless connection. In some implementations, the coupling 40 includes another communications node, for example an electronic message server. An example of how the coupling 40 may include an electronic message server is detailed below. More generally, the coupling 40 may include any network infrastructure between the communications node 30 and user nodes 50. If communication is over the public Internet, the coupling 40 can include any number of lines and networks.

Electronic Message Routing

Figure 2:
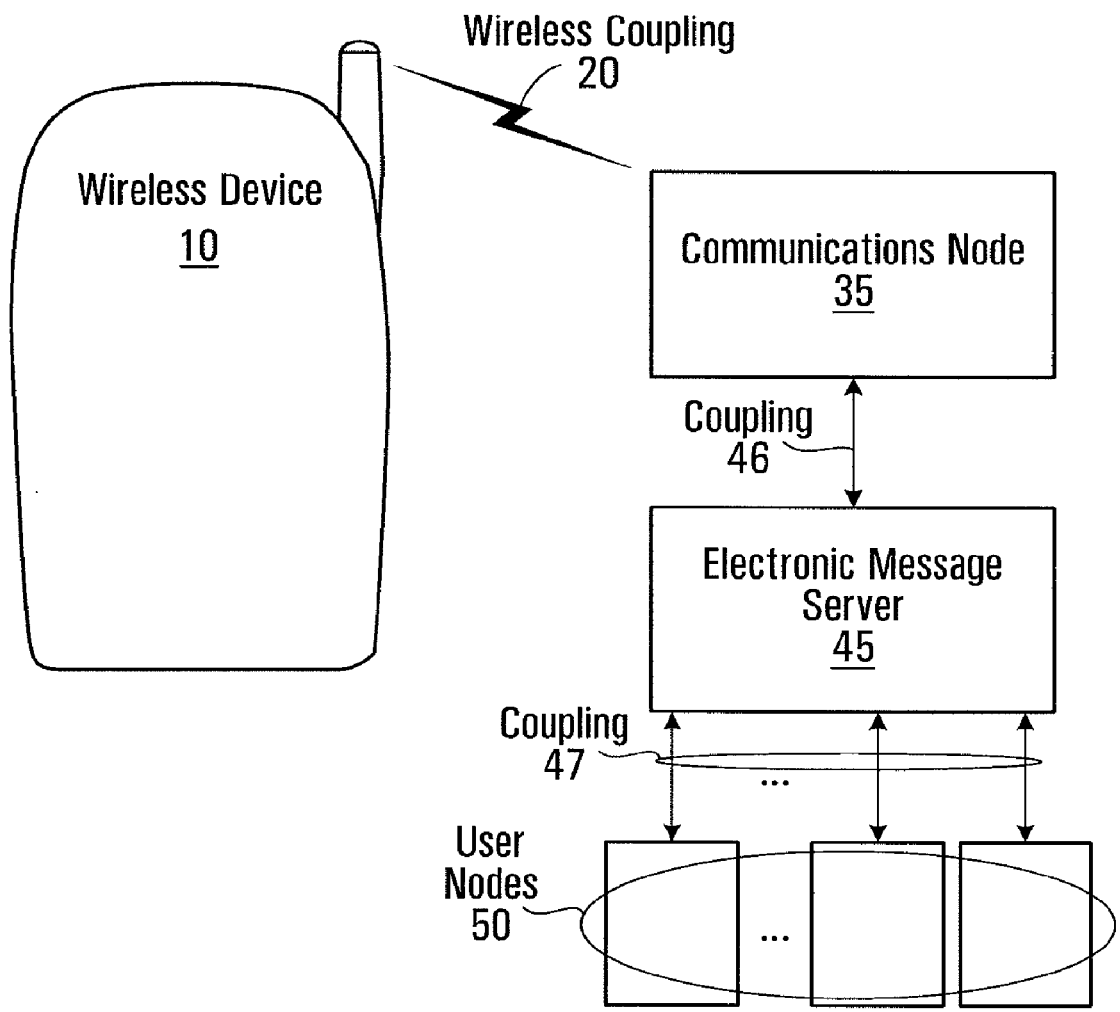
FIG. 2 is a schematic of an example network having a communications node coupled to an electronic message server.

Referring now to FIG. 2, shown is a schematic of an example network having a communications node 35 coupled to an electronic message server 45. The communications node 35 is coupled to the wireless device 10 via wireless coupling 20. The electronic message server 45 is coupled to the communications node 35 via coupling 46 and coupled to the user nodes 50 via coupling 47.

In operation, the communications node 35 functions much like the communications node 30 shown in FIG. 1, but communicates with the user nodes 50 through the electronic message server 45. The electronic message server 45 routes electronic messages received from the communications node to one or more recipient, for example the user nodes 50. The electronic message server 45 also informs the communications node 35 of any electronic messages addressed to the wireless device 10.

The electronic message server 45 may be any appropriate electronic message server, for example Microsoft Exchange Outlook, IBM Lotus Domino, or Novell GroupWise.

When a user node sends an electronic message addressed to the wireless device 10, the electronic message server receives the electronic message and routes it to the communications node 35. The communications node 35 stores a copy of the electronic message. In some implementations, when the electronic message is large, the communications node 35 initially transmits only a first portion of the electronic message to the wireless device 10. In a specific example, the first portion is the first 2000 bytes of the electronic message. In this example, electronic messages that are smaller than 2000 bytes are wholly transmitted. The first portion contains an identification of the electronic message. If the user of the wireless device 10 wishes to view more than the first portion of the electronic message, then the wireless device 10 requests additional portions of the electronic message. In some implementations, the request includes the identification of the electronic message. In response, the communications node 35 provides the user with the requested portions of the electronic message.

In some implementations, when there is an electronic message with an attachment addressed to the wireless device 10, the communications node 35 initially transmits the electronic message without the attachment. If the user of the wireless device 10 wishes to access the attachment, then the wireless device 10 requests the attachment. In some implementations, the request includes an identification of the electronic message and/or the attachment. In response, the communications node 35 transmits the attachment to the wireless device 10.

In some implementations, when there is an electronic message addressed to the wireless device 10 and the wireless coupling 20 is not available, the communications node 35 places the electronic message into a queue. Once the wireless coupling 20 becomes available again, the electronic message or a portion thereof may be transmitted to the wireless device 10.

In some implementations, one of the user nodes 50 is a computer having synchronised electronic files with the wireless device 10. In a first example, electronic messages maintained by the wireless device 10 are identical to electronic messages maintained by the computer. Accordingly, the user of the computer and the wireless device 10 can use either the computer or the wireless device 10 for exchanging electronic messages while having the computer and the wireless device 10 synchronised in respect to electronic messages.

Electronic File Selection and Identification

Referring now to FIGS. 3 through 7, shown are flowcharts of example methods of selecting an electronic file stored in a repository of a communications node to be attached in a new electronic message. These methods may be implemented by a wireless device, for example by the electronic file identification function 13 of the wireless device 10 shown in FIG. 1.

Figure 3:
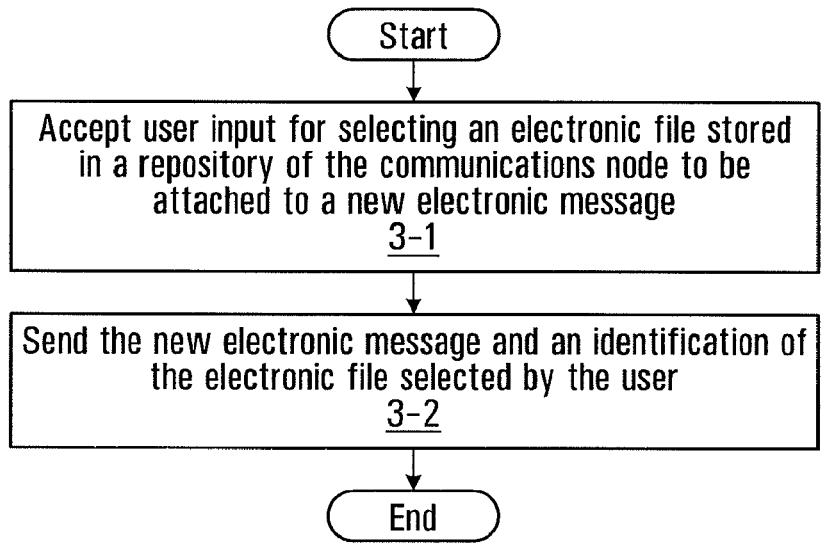
FIGS. 3 through 7 are flowcharts of example methods of selecting an electronic file stored in a repository of a communications node to be attached in a new electronic message.

The method with reference to FIG. 3 will now be described. At step 3-1, the wireless device accepts user input for selecting an electronic file stored in a repository of the communications node to be attached to a new electronic message being composed. At step 3-2, the wireless device sends the new electronic message and an identification of the electronic file. The identification enables the communications node to identify and attach the electronic file to the new electronic message.

In some implementations, the identification of the electronic file is sent as part of the new electronic message. In other implementations, it is sent separately and the communications node associates the identification with the new electronic message by any appropriate manner.

There is no requirement for the wireless device to have a locally stored copy of the electronic file for the wireless device to identify the electronic file for attachment in the new electronic message. However, in some instances the wireless device will have a locally stored copy of the electronic file.

In some implementations, the new electronic message sent over the air includes a message header. This may for example include one or more recipient addresses, a priority indication, and an address of the sender. The format of the message header may be dependent upon the type of electronic message being used and the electronic message application used to generate the message header.

In some implementations, the new electronic message sent over the air includes a signature of the sender. In other implementations, the new electronic message does not include a signature. In other implementations, the communications node adds a signature to the new electronic message before sending it to one or more recipients.

There are many possibilities for the electronic file. In some implementations, the electronic file may be any electronic file as long as a copy is maintained by the communications node. Although the method has been described with reference to a single electronic file, more generally, a plurality of electronic files may be selected by the user for attachment in the new electronic message. The identification of the electronic file contains an identifier, which may be dependent upon the electronic file. For example, the way that an identifier identifies an attachment in respect of a previously received message may be different than the way that another identifier identifies an electronic file stored in an electronic message application folder. Specific examples are detailed below with reference to FIGS. 4 through 7.

Electronic Messages

Figure 4:
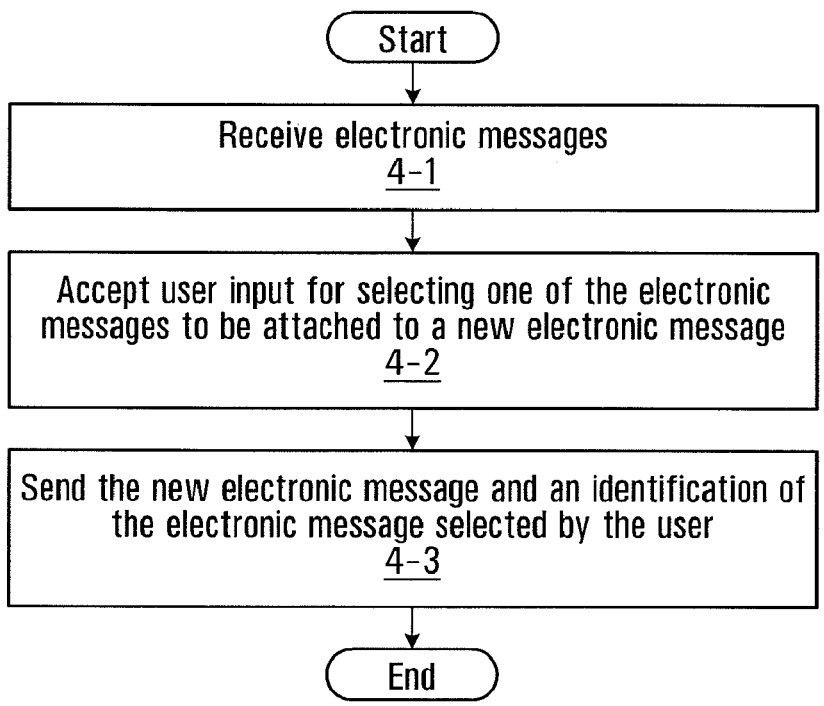

Referring now to FIG. 4, shown is a flowchart of an example method of selecting a previously received electronic message for attachment in a new electronic message. At step 4-1, the wireless device receives electronic messages. At step 4-2, the wireless device accepts user input for selecting one of the electronic messages to be attached to a new electronic message being composed. At step 4-3, the wireless device sends the new electronic message and an identification of the electronic message selected by the user.

In the above example, the electronic message selected by the user is one of the previously received electronic messages. Alternatively, the electronic message selected by the user may be an electronic message composed and/or sent by the user as long as the communications node has maintained a copy of the electronic message.

In the above example, a single electronic message is selected by the user to be attached to the new electronic message. Alternatively, the user may select any number of electronic messages to be attached to the new electronic message. The electronic messages selectable by the user may be of any size, and may or may not have attachments therein.

The electronic messages received by the wireless device may be complete electronic messages or incomplete electronic messages. As described earlier, the wireless device may receive only a first portion of an electronic message. The communications node maintains a complete copy of the electronic messages.

There are many ways in which the wireless device may send an identification of the electronic message selected by the user. In some implementations, an electronic message received, regardless of being complete or incomplete, contains a message identifier. In some embodiments, the message identifier is used as the identification of the electronic message selected by the user. In other implementations, the wireless device generates the identification based on attributes of the electronic file selected by the user. Example attributes include timestamp, addressee, size, etc. Other identification schemes are possible.

Figure 5:
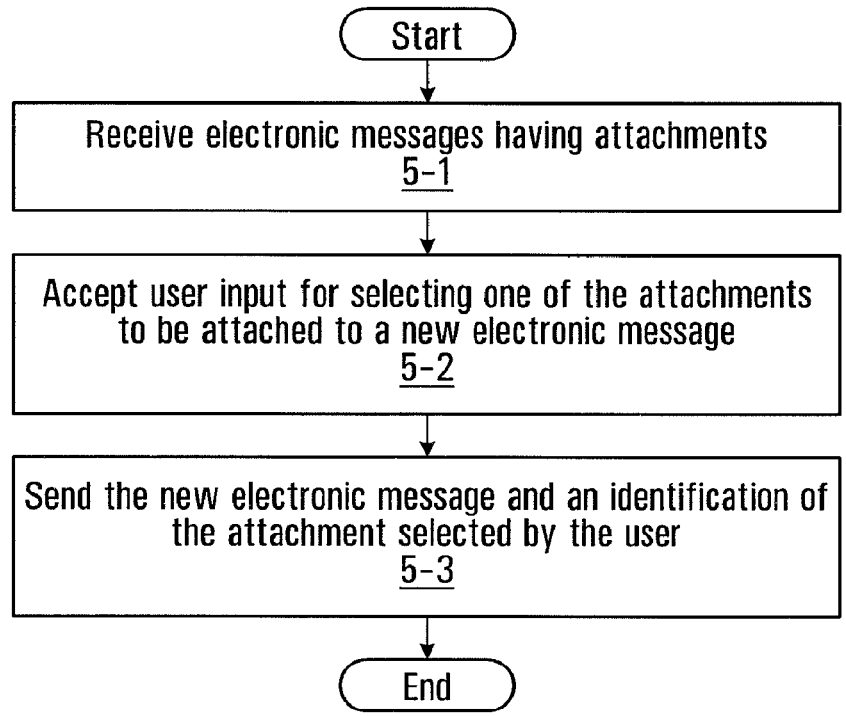

Referring now to FIG. 5, shown is a flowchart of an example method of selecting an electronic file attached to a previously received electronic message for attachment in a new electronic message. At step 5-1, the wireless device receives electronic messages having attachments. At step 5-2, the wireless device accepts user input for selecting one of the attachments to be attached to a new electronic message being composed. At step 5-3, the wireless device sends the new electronic message and an identification of the attachment selected by the user.

In the above example, the attachment selected by the user is in respect of a previously received electronic message. Alternatively, the attachment selected by the user may be in respect of an electronic message composed and/or sent by the user as long as the communications node has maintained a copy of the attachment.

In the above example, a single electronic file is selected by the user to be attached to the new electronic message. Alternatively, the user may select any number of electronic files in respect of any number of electronic messages to be attached to the new electronic message. The electronic files may or may not be electronic messages themselves, may be of any size, and may or may not have attachments.

The electronic messages received by the wireless device may be complete electronic messages or incomplete electronic messages. As described earlier, the wireless device may receive only a first portion of an electronic message. An incomplete electronic message may for example not include its respective attachment. The communications node maintains a complete copy of the electronic messages and attachments therein.

There are many ways in which the wireless device may send an identification of the attachment selected by the user. In some implementations, an electronic message received, regardless of being complete or incomplete, contains an identifier for identifying the electronic message and/or its respective attachment. In some embodiments, the identifier is used as the identification of the attachment selected by the user. In other implementations, the wireless device generates the identification based on attributes of the attachment selected by the user. Example attributes include file name, file size, etc. Other identification schemes are possible.

Electronic Message Application Folders

In some implementations, the wireless device allows the user to store electronic files in an electronic message application folder of the communications node and/or electronic message server. The electronic message application folder may be in respect of any appropriate electronic message application, for example Microsoft Exchange Outlook, IBM Lotus Domino, or Novell GroupWise. In some implementations, the electronic message application folder is an MS Outlook folder of an MS Exchange Server and is capable of storing many different types of files, for example email messages, any MS office file, jpeg-files, and pdf-files.

The electronic files may originate from many different sources, for example electronic messages, the wireless device, or the communications node. In some implementations, electronic files attached to electronic messages received on the wireless device are added to one or more designated electronic message application folders so they are available even if the electronic message is deleted. In some implementations, this is done automatically by setting up a profile to store various electronic files. The profile could for example be used to store all electronic files, electronic files from electronic messages from specific addresses, or electronic files attached to electronic messages with specific subject lines.

In some implementations, there is provided an ageing feature, which automatically deletes files from an electronic message application folder when the files are deemed to have been unused for a given time period. In some implementations, the ageing feature is provided as part of a profile and deletes electronic files if the electronic files originated from an electronic message that has been deleted or determined to have been unused for a given time period.

In some implementations, electronic files stored in an electronic message application folder are synchronised with electronic files on the wireless device so that any changes to the electronic files on the wireless device are reflected in the electronic message application folder and vice-versa.

In some implementations, information sufficient to allow different electronic files bearing the same file name in a single electronic message application folder is provided.

Figure 6:
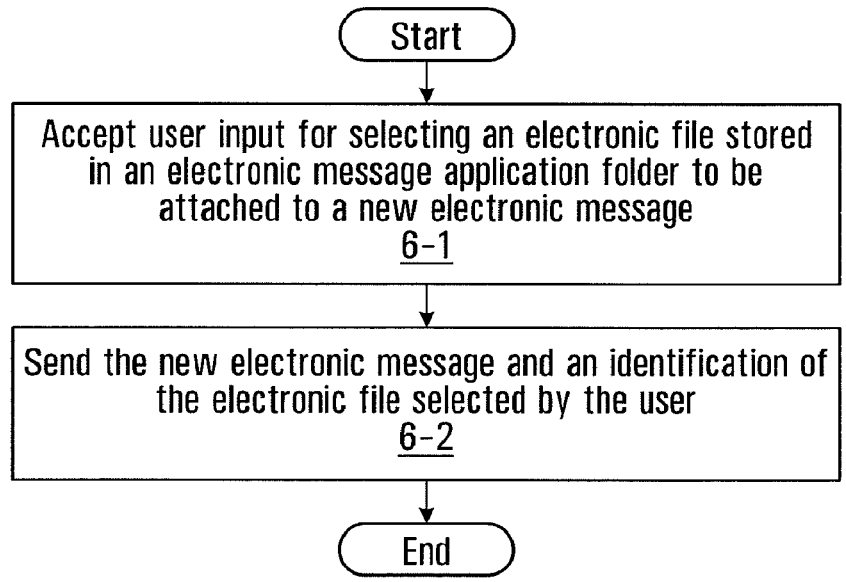

Referring now to FIG. 6, shown is a flowchart of an example method of selecting an electronic file of an electronic message application folder for attachment in a new electronic message. At step 6-1, the wireless device accepts user input for selecting an electronic file stored in an electronic message application folder of the communications node to be attached to a new electronic message being composed. At step 6-2, the wireless device sends the new electronic message and an identification of the electronic file.

In the above example, the user selects a single electronic file to be attached to the new electronic message. However, it is possible for the user to select any number of electronic files.

In some implementations, the identification contains an identifier for identifying the electronic files that the user has selected. In some implementations, the identifier is provided to the wireless device by the communications node. In other implementations, the wireless device generates the identifier. In some implementations, the identifier includes an identification of the electronic message application folder and a filename. In some implementations, other parameters may be included so as to differentiate between different electronic files bearing the same filename.

Memos

In some implementations, the wireless device allows the user to record notes or memos in the form of text in a memo file. A memo file is synchronised between the wireless device and the repository of the communications node so that any changes to the memo file on the wireless device are reflected in the repository and vice-versa. In some implementations, another user node in communication with the communications node may access the memo file. The other user node may read and write to the memo file. When fully synchronised, the copy of the memo file in the repository is identical to the copy of the memo file on the wireless device.

Figure 7:
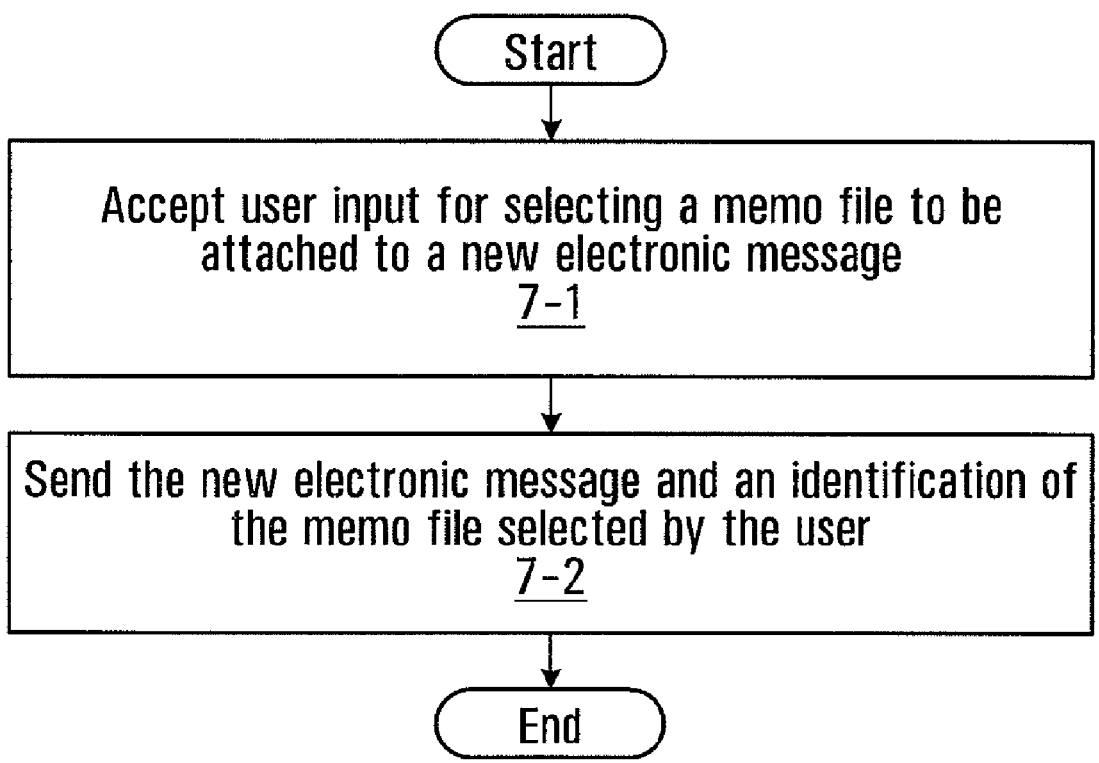

Referring now to FIG. 7, shown is a flowchart of an example method of selecting a memo file for attachment in a new electronic message. At step 7-1, the wireless device accepts user input for selecting a memo file to be attached to a new electronic message being composed. At step 7-2, the wireless device sends the new electronic message and an identification of the memo file.

In the above example, the user selects an entire memo file to be attached to the new electronic message. However, it is possible for the user to select a portion of a memo file. It is also possible to select more than one memo file.

In some implementations, the identification contains a memo identifier for identifying the memo file(s) and what specific portions of the memo file(s) the user has selected. In some implementations, the memo identifier is provided to the wireless device by the communications node. In other implementations, the wireless device generates the memo identifier. Other identification schemes are possible.

Many examples have been provided of possible electronic files that the user may select for attachment in a new electronic message. It is to be understood that combinations of such examples are possible. For example, in some implementations, the user may select a memo file and an electronic message for attachment in the new electronic message. Accordingly, the identification would include any appropriate combination of identifiers for identifying the memo file and the electronic message. Other combinations are possible.

Attaching an Electronic File

Figure 8:
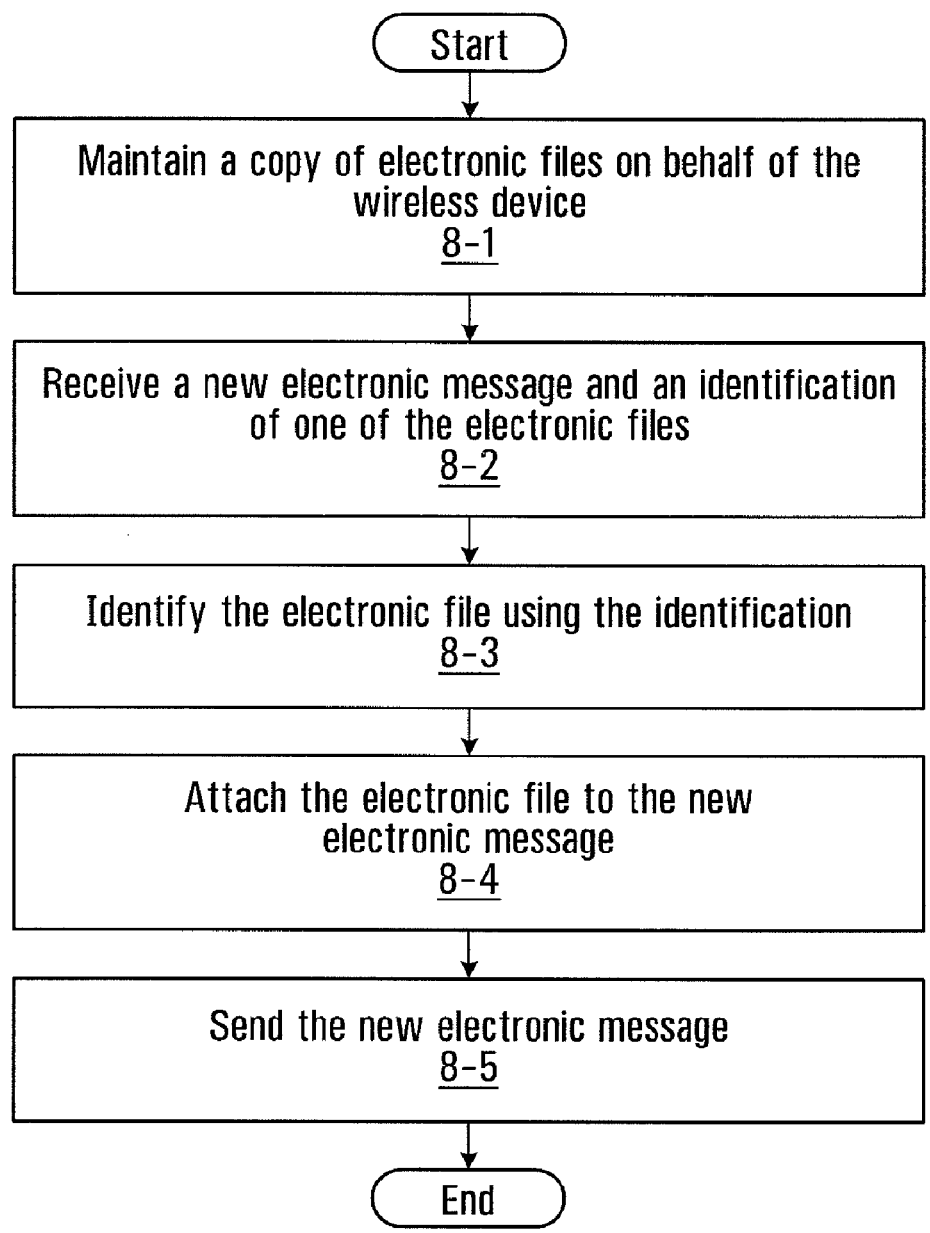
FIG. 8 is a flowchart of an example method of attaching an electronic file to a new electronic message.

Referring now to FIG. 8, shown is a flowchart of an example method of attaching an electronic file to a new electronic message. This method may be implemented in a communications node, for example by the electronic file attachment function 31 of the communications node 30 shown in FIG. 1. At step 8-1, the communications node maintains a copy of electronic files on behalf of the wireless device. At step 8-2, the communications node receives a new electronic message and an identification of one of the electronic files. At step 8-3, the communications node identifies the electronic file using the identification sent from the wireless device. At step 8-4, the communications node attaches the electronic file to the new electronic message. At step 8-5, the communications node sends the new electronic message.

In the above example, a single electronic file is attached to the new electronic message based on the identification received. More generally, a plurality of electronic files may be attached to the new electronic message in cases when the user selects a plurality of electronic files to be attached.

There are many possibilities for the electronic file. As discussed above, the electronic file may for example be an electronic message, an attachment, an electronic file stored in an electronic message application folder, or a memo file. In the case that the electronic file is an electronic message received by the wireless device, the communications node first transmits the electronic message to the wireless device.

Referring now to FIG. 9, shown is a flowchart of an example method of transmitting electronic messages. This method may be implemented in a communications node, for example by the electronic file attachment function 31 of the communications node 30 shown in FIG. 1. At step 9-1, the communications node receives electronic messages addressed to the wireless device. At step 9-2, the communications node stores a copy of each electronic message in the repository. At step 9-3, the communications node sends each electronic message to the wireless device.

The electronic messages received by the communications node may for example have been received from an electronic message server, for example the electronic message server 45 shown in FIG. 2. Other possibilities exist.

As previously discussed, the repository may be contained within the communications node or reside external to the communications node.

As previously discussed, the communications node may not send each of the electronic messages in their entirety to the wireless device. In some implementations, a portion of each electronic message is sent to the wireless device. In some implementations, the portion contains an identifier for identifying the electronic message and any attachments therein.

In some implementations, the communications node accepts input to selectively prevent or permit enterprise-related attachments to be sent using Internet email or non-enterprise instant messaging. This provides for a policy capability enabling the enterprise (IT group) to prevent or permit "enterprise-related" attachments to be sent using internet email or non-enterprise instant messaging.

User Interface

As described above, the user uses a user interface of the wireless device to input their selection of electronic files to be attached to a new electronic message being composed. Referring now to FIG. 10, shown is a schematic of an example user interface 100 of a wireless device. The user interface 100 has a display 101 and an input 102.

In operation, the display 101 is adapted to display choices and options for the user in any appropriate format. The user may input selections using the input 102. The input 102 includes any appropriate components so as to allow a user to input selections. This may for example include buttons, a click wheel, a touch pad, a thumb wheel, or combinations thereof.

Shown in FIG. 11 is a schematic of an example menu that may be displayed by the display 101 when composing a new message. It is to be understood that this is a very specific menu selection for examplary purposes only. In some implementations the menu items displayed are dependent on certain factors. For example, the menu items displayed may be dependent on where a cursor is currently placed, and whether any text has been highlighted. The menu items include a number of choices and options for the user. In particular, the menu selection includes "Attach Message", "Attach File", and "Attach Memo" among other possible choices and options.

In some implementations, upon selection of "Attach Message", a second menu selection is displayed (not shown) showing possible messages that may be attached to the new electronic message. In some implementations, the second menu selection includes a list of all previously received electronic messages. The user may select one or multiple electronic messages. In specific implementations, consecutive electronic messages are selected by pressing "num shift" and using a thumbwheel while non-consecutive electronic messages are selected by pressing "ALT" for each electronic message being selected. Other implementations are possible.

In some implementations, upon selection of "Attach File", a third menu selection is displayed (not shown) showing possible electronic files that may be attached to the new electronic message. In some implementations, the third menu selection displays in a list all electronic files that may be attached to the new electronic message. In some implementations, the list is organised in a manner that visually separate electronic files according to origin. For example, electronic files in respect of electronic message attachments and in respect of electronic message application folders may be visually separated.

In some implementations, upon selection of "Attach Memo", a fourth menu selection is displayed (not shown) showing possible memo files that may be attached to the new electronic message. In some implementations, the fourth menu selection allows one to select more than one memo file or portions of memo files.

In some implementations, the wireless device will display an error or warning message if any electronic file has not been fully synchronised with the repository of the communications node before the user selects it to be attached. In other implementations, the wireless device displays an error or warning message at the time the user selects an electronic file if the electronic file has not been fully synchronised. In other implementations, no warning or error messages are provided.

Referring now to FIG. 12, shown is a schematic of an example table of electronic files that may be displayed by the user interface of FIG. 10. It is to be understood that the table of electronic files shown in FIG. 12 is very specific for examplary purposes only. The table of electronic files lists a plurality of electronic files 126. For each of the electronic files 126, several attributes are shown. The attributes include a file name 120, a file type 121, a file source 122, a file public indication 123, a file date 124, and a file note 125.

In some implementations, the table of electronic files is displayed by the user interface shown in FIG. 10 to provide the user with information concerning electronic files that are immediately available for sending via e-mail or via instant messaging. In some implementations, electronic files that are not immediately available for sending are not displayed. In other implementations, electronic files that are not immediately available for sending are displayed, but are displayed in a manner that distinguishes from the electronic files that are immediately available for sending.

The file name 120 may be used by the user to identify the electronic files. The file type 121 is indicated as a file extension, for example "pdf" indicates a portable document format. The file source 122 indicates the source of the electronic files. For example, "EM-john" indicates that the electronic file was received via email from another user identified as John. The file public indication 123 indicates whether the electronic files are public or not. In some implementations, if the electronic files are "enterprise-related" (not public) then this would be indicated as a reminder that it should be treated with more sensitivity, and only sent on a 'need-to-know' basis. The file date 124 indicates a date for each electronic file. This may be for example a date of creation, a date of modification, a date of receipt, or a date category. In some implementations, the date category includes today, past week, past month, and past quarter. The file note 125 may be used to further identify the electronic files. In some instances, the file name 120 of an electronic file may not be enough to clearly indicate its content. Therefore, the file note 125 enables the user to indicate an electronic file in more detail.

In some instances, the table of electronic files is too large to be appropriately displayed in its entirety on a single screen. In some implementations, vertical and/or horizontal scrolling or other means could be used to view all information from the table of electronic files in any appropriate manner.

In some implementations, any message in the mobile device Message List may be used as an attachment. If a message is known to be a potential attachment, it can be tagged (either from the mobile device or from the user's PC email program), identified as a potential attachment, and placed as an entry in the mobile device's table of electronic files while placing the actual email in the appropriate repository. If this is done, then in some implementations the auto-aging of the email mailbox would not be applied to it, rather the auto-aging or other preference of the user would be applied to it.

In some implementations, the table of electronic files shown in FIG. 12 may include electronic files that are already stored and available in a single repository or in a multiplicity of repositories. The latter situation would be an approach when the mobile communications device is used for both enterprise communications and for personal communications such as "Internet" email or personal Instant Messaging. A folder of the enterprise email server is an example repository for enterprise files. A folder in the "Internet" email server is another example repository.

In some implementations, the two sets of "attachments" are displayed using a single table on the mobile device. In some implementations, there are several options available. For example, the user may choose between a single table, where the user can choose to display only enterprise or only non-enterprise "attachments", or choose to display only certain types of "attachments" (Word documents, Powerpoint documents, . . . ). As another example, the user is enabled to search the list for "attachments" meeting specific criteria. Other options may be available.

In some implementations, any entry in the Attachment list can be used as an attachment to an email or as a file to be sent over an Instant Messaging session. Accordingly, an email message can be sent either as an email attachment or as a file transmission via an instant messaging session. In some implementations, if the user wishes to do so, the user can save an email message as a file in a desired format, access the file in the folder where it had been saved, and send it over the instant messaging session. Once the email is identified as a potential attachment, it can immediately be sent over an instant messaging session.

In some implementations, the communications device automatically removes entries from the table of electronic files after a defined period of time. There are many ways that this can be accomplished. In some implementations, the user interface accepts user input for auto-ageing and removal of entries from the table of electronic files. The user input may for example include a multiplicity of retention times for different entries in the table of electronic files.

Electronic Message Implementations

In the examples described above, references to "electronic messages" are made. There are many possibilities for the electronic messages. In some implementations, the electronic messages are any appropriate type of electronic message supporting the attachment of electronic files. For example, the electronic messages may be email messages attachment-enabled PIN (personal identification number) messages, or multimedia messaging system (MMS) messages. In some implementations, combinations of electronic messages are used.

Communication Sessions

In another embodiment, electronic files are transmitted in a communications session whereby electronic files are not attached to an electronic message per se. An example of a communications session is an Instant Messaging (IS) session. In the case of transmitting an electronic file in a communications session, there is no need for the wireless device to transmit an attachment-enabled electronic message to the communications node, as the electronic file is not attached to an electronic message. Examples are provided below with reference to FIGS. 13 to 15 to illustrate this point.

Figure 13:
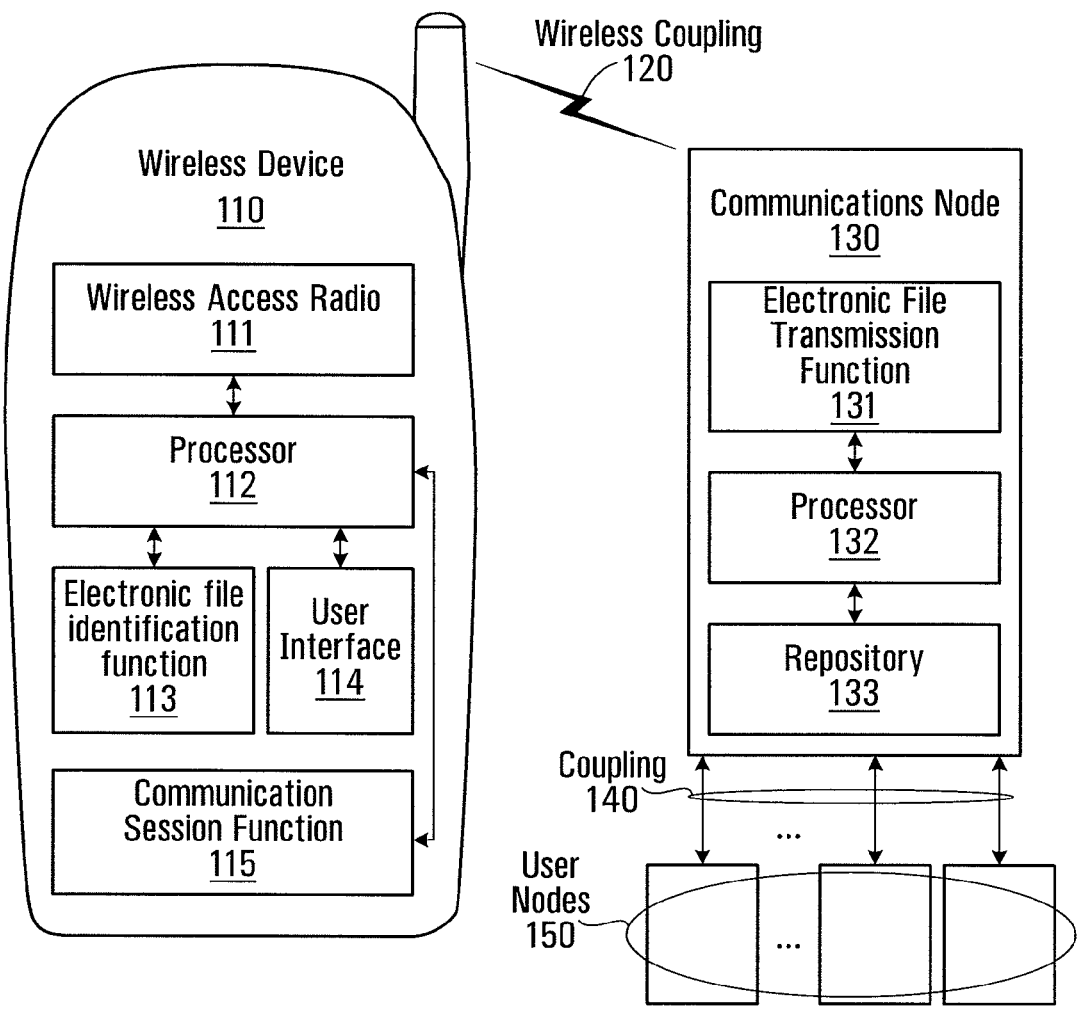
FIG. 13 is a schematic of another example network having a wireless device coupled to a communications node.

Referring to FIG. 13, shown is a schematic of an example network having a wireless device 110 coupled to a communications node 130. The wireless device 110 has a wireless access radio 111, a processor 112, an electronic file identification function 113, a user interface 114, and a communication session function 115. The wireless device 110 is coupled to the communications node 130 via a wireless coupling 120, which in turn is coupled to a plurality of user nodes 150 via coupling 140. The communications node 130 has an electronic file transmission function 131, a processor 132, and a repository 133. The wireless device 110 and the communications node 130 may have other components, but they are not shown for sake of simplicity.

In operation, the wireless device 110 is adapted to communicate with the communications node 130 via the wireless access radio 111 and the wireless coupling 120. Such communication may for example include communication transmitted over a communication session, for example an Instant Message session. The communication session function 115 is adapted to maintain a communication session with another party. According to an embodiment of the application, the electronic file identification function 113 allows a user of the wireless device 110 to select and identify an electronic file stored in the repository 133 of the communications node 130 for transmission in the communication session. The wireless device 110 transmits an identification of the electronic file to be transmitted over the communication session. The electronic file itself is not transmitted over the wireless coupling 120. The user may select the electronic file for example using the user interface 114.

The electronic file transmission function 131 of the communications node 130 receives the identification of the electronic file, identifies the electronic file using the identification, and transmits the electronic file in the communication session. The recipient may for example be one of the user nodes 150.

The operation of the wireless device 110 and the communications node 130 has been described above with reference to a single electronic file. More generally, the user may select a plurality of electronic files to be transmitted over the communication session.

In some implementations, the electronic file identification function 113 and the communication session function 115 are each implemented as software and are executed on the processor 112. More generally, the electronic file identification function 113 and the communication session function 115 may each be implemented as hardware, software, firmware, or any combination thereof.

In some implementations, the electronic file transmission function 131 is implemented as software and is executed on the processor 132. More generally, the electronic file transmission function 131 may be implemented as hardware, software, firmware, or any combination thereof.

There are many possibilities for the repository 133. The examples provided above in respect of the repository 33 shown in FIG. 1 are applicable to the repository 133. Therefore, such examples are not repeated.

There are many possibilities for the wireless coupling 120. The examples provided above in respect of the coupling 20 shown in FIG. 1 are applicable to the coupling 120. Therefore, such examples are not repeated.

There are many possibilities for the coupling 140. The examples provided above in respect of the coupling 40 shown in FIG. 1 are applicable to the coupling 140. Therefore, such examples are not repeated.

Figure 14:
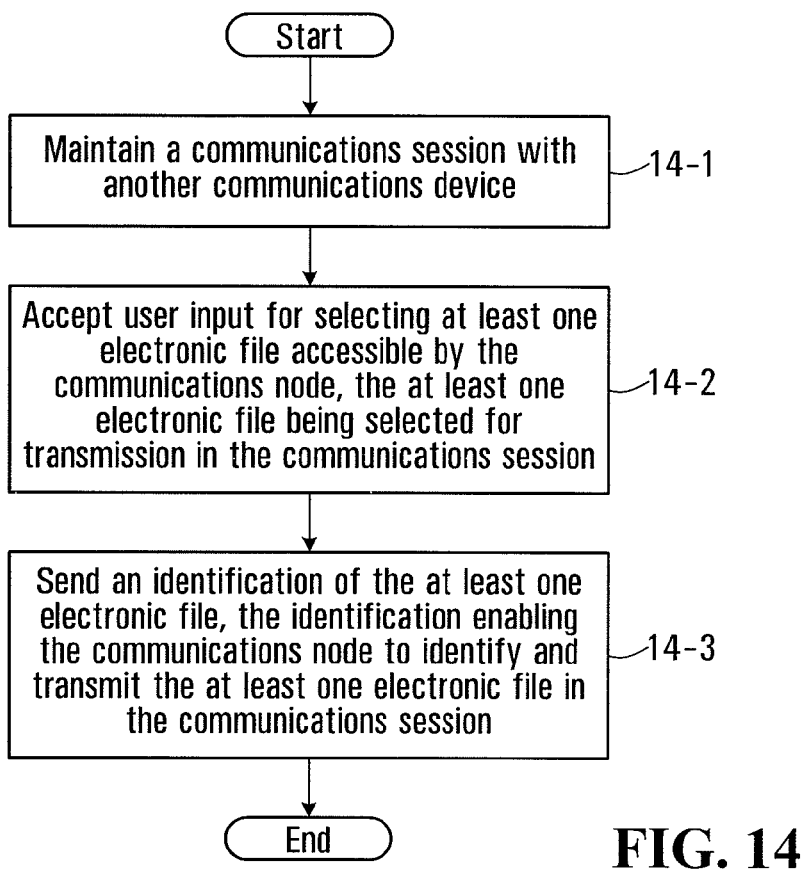
FIG. 14 is a flowchart of an example method of selecting at least one electronic file that is accessible by a communications node for transmission in a communications session.

Referring now to FIG. 14, shown is a flowchart of an example method of selecting at least one electronic file that is accessible by a communications node for transmission in a communications session. This method may be implemented by a wireless device, for example by the electronic file identification function 113 of the wireless device 110 shown in FIG. 13. At step 14-1, the wireless device maintains a communications session with another communications device. At step 14-2, the wireless device accepts user input for selecting at least one electronic file that is accessible by the communications node. The at least one electronic file is selected for transmission in the communications node to a recipient. At step 14-3, the wireless device sends an identification of the at least one electronic file. The identification enables the communications node to identify and transmit the at least one electronic file in the communications node.

Figure 15:
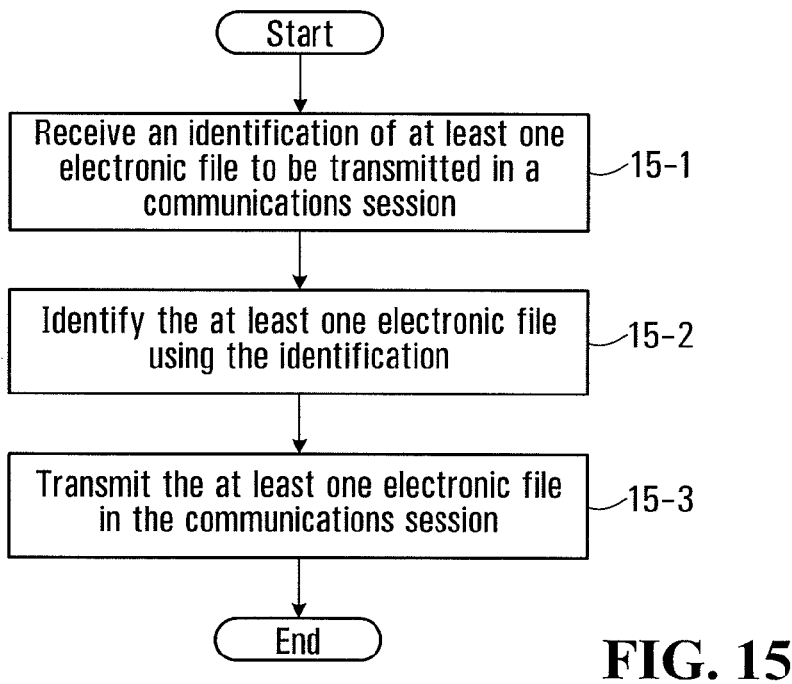
FIG. 15 is a flowchart of an example method of transmitting at least one electronic file in a communications session.

Referring now to FIG. 15, shown is a flowchart of an example method of transmitting at least one electronic file in a communications session. This method may be implemented in a communications node, for example by the electronic file transmission function 131 of the communications node 130 shown in FIG. 13. If at step 15-1 the communications node receives an identification of at least one electronic file to be transmitted in a communications session, then at step 15-2 the communications node identifies the at least one electronic file using the identification. At step 15-3, the communications node transmits the at least one electronic file to the recipient in the communications session.

It is to be understood that the description of implementations and variations provided above in respect of FIGS. 1 through 12 similarly apply, where appropriate, to the embodiment described above with reference to FIGS. 14 and 15. For example, as previously described, there are many locations in which the at least one electronic file may reside and still be accessible to the communications node. The at least one electronic file may reside in any appropriate repository, which may or may not reside in communications node. For example, the at least one electronic file may reside in an electronic message application folder of an electronic message server, a shared directory of an enterprise network, or the Internet.

Communications Device

The examples provided above make specific reference to wireless devices. However, it is to be understood that embodiments of the application are also applicable to wired devices. More generally, embodiments of the application are applicable to any communications device regardless of whether the communications device is a wireless device, a wired device, or a device having a combination of wired and wireless connections.

Other Communication Systems

Figure 16:
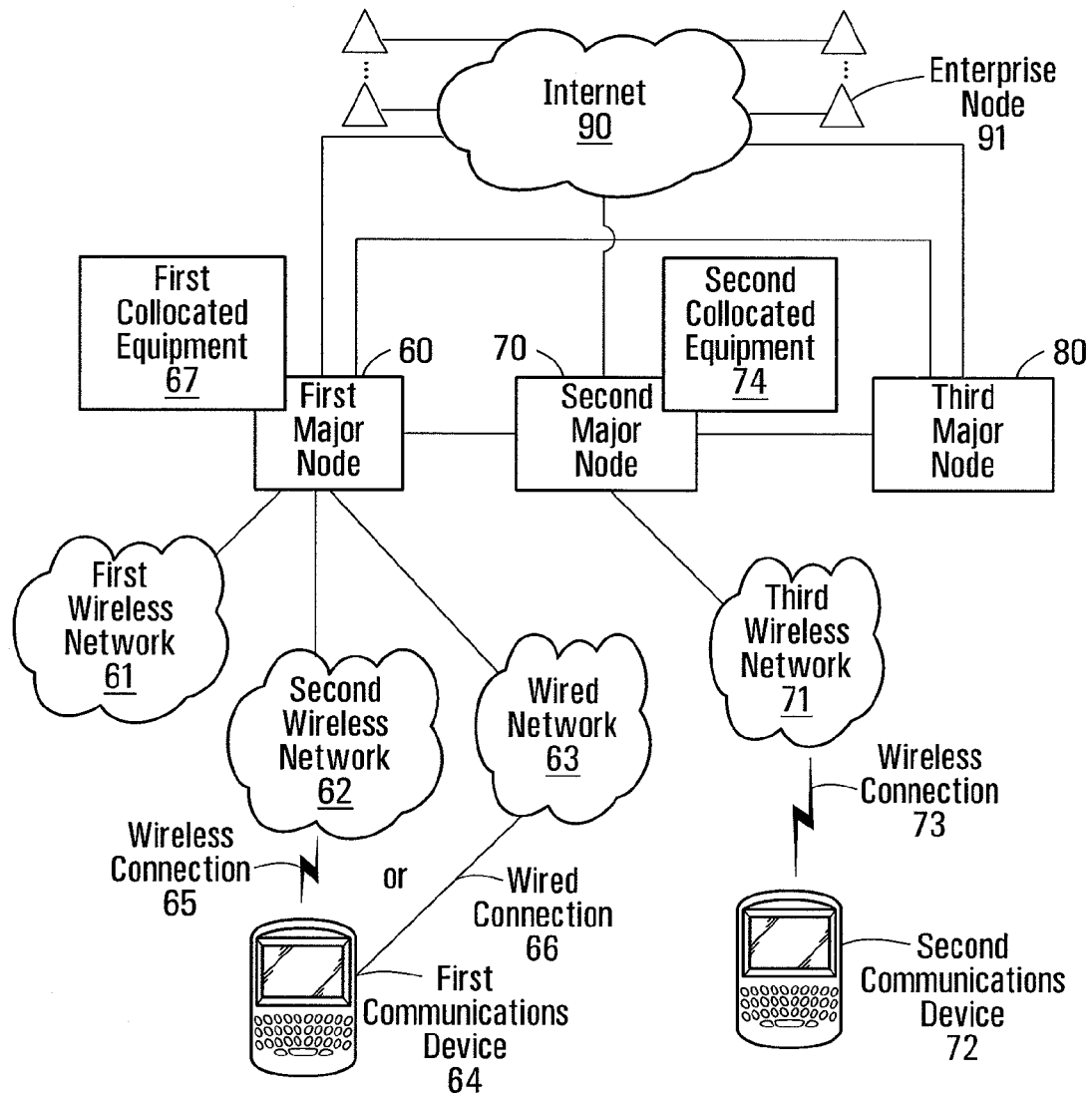
FIG. 16 is a schematic of an example communication system.

It is to be understood that embodiments of the application are applicable to a broad range of communication systems. There are many implementation specific possibilities for the communication system. Referring now to FIG. 16, shown is a schematic of an example communication system. It is to be understood that this communication system is very specific for examplary purposes only.

The communication system has a plurality of major nodes 60,70,80 including a first major node 60, a second major node 70, and a third major node 80. Each of the plurality of major nodes is coupled to one another and to an Internet 90. The plurality of major nodes 60,70,80 with interconnections among some or all of these nodes provide reliable and redundant communication paths between any two major nodes. The Internet 91 is coupled to a plurality of nodes including an enterprise node 91. The first major node 60 is coupled to a first collocated equipment 67 while the second major node 70 is coupled to a second collocated equipment 74. In some implementations, the first major node 60 is a relay. The first major node 60 is coupled to a first wireless network 61, a second wireless network 62, and a wired network 63. The wired network 63 may be any appropriate wired network, for example a PSTN (public switched telephone network), or an ISDN (Integrated Services Digital Network). A first communications device 64 communicates with the second wireless network over a wireless connection 65, or communicates with the wired network 63 over a wired connection 66. The second major node 70 is coupled to a third wireless network 71. A second communications device 72 communicates with the third wireless network 71 over a wireless connection 73. The communication system may have other components, but they are not shown for sake of simplicity.

Figure 17:
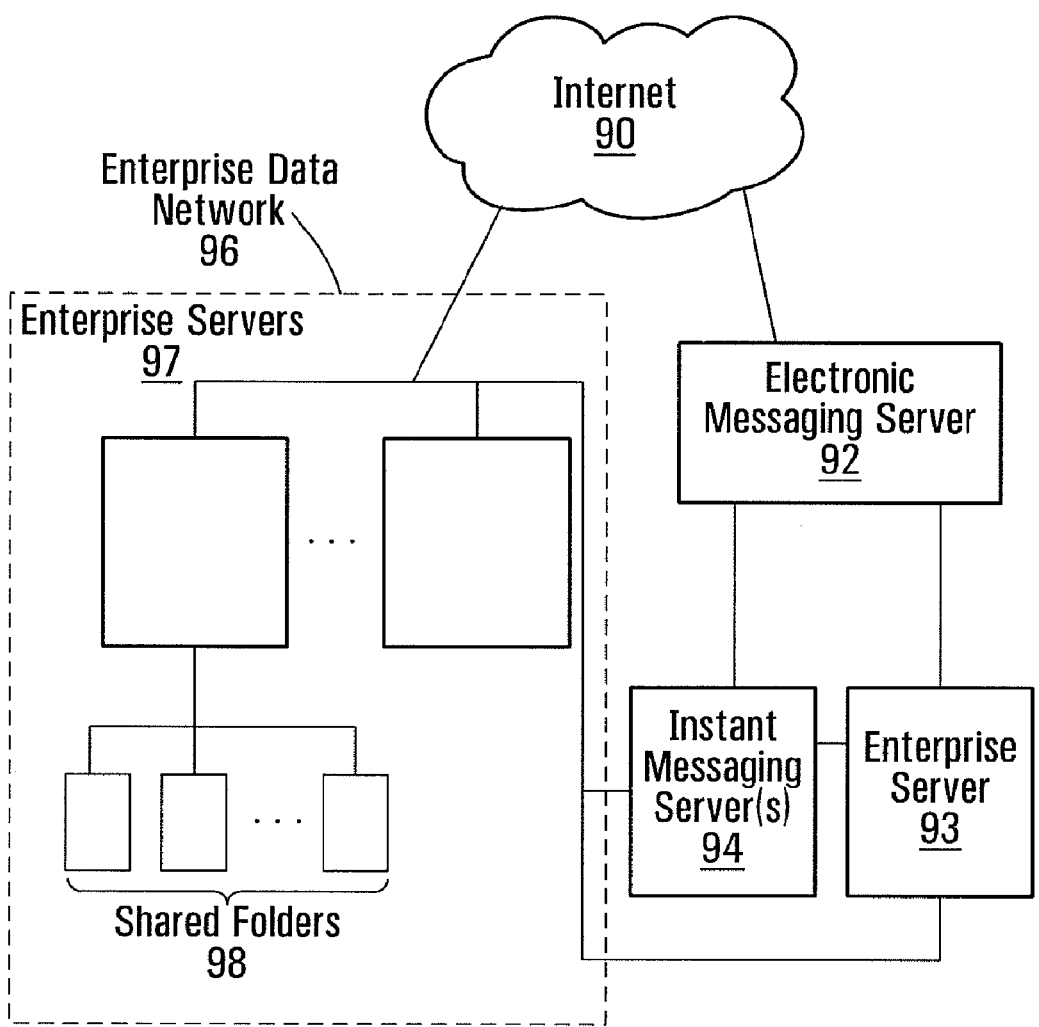
FIG. 17 is a schematic showing more detail of the enterprise node shown in FIG. 15.

Referring now to FIG. 17, shown is a schematic showing more detail of the Enterprise node 91 shown in FIG. 16. It is to be understood that the enterprise node 91 shown in FIG. 17 is very specific for examplary purposes only. An electronic messaging server 92 is coupled to an instant messaging server(s) 94 and an enterprise server 93. The instant messaging server(s) 94 and the enterprise server 93 are both coupled to an enterprise data network 96. The enterprise data network 96 has enterprise servers 97, which in turn have a data repository, namely shared folders 98 in this example. The electronic messaging server 92 and the enterprise data network 92 are both coupled to the Internet 92. There may be other components, but they are not shown for sake of simplicity. While elements are shown as separate elements, it is to be understood that one or more elements may be combined as a single component, for example within one computer or multi-computer element. It is also possible that some of the elements may be at different locations, even if the enterprise only has a single campus.

In some implementations, the enterprise node is located on the enterprise premises and is controlled by the enterprise. The enterprise node is connected to the enterprise's email system, namely the electronic message server 92 in this example. The enterprise node includes the instant messaging server(s) 94 for the various instant messaging systems that are provided via mobile devices, and for any enterprise instant messaging system(s) 94. The instant messaging server(s) 94 is also connected to the enterprise data network 96.

In some implementations, the enterprise node has a firewall(s) (not shown) or other components to protect the enterprise network from intrusion by unauthorized parties and from viruses and other malware.

In some implementations, the repository for the enterprise mobile device user is located within the control of the enterprise. In some implementations, the repository is a folder within the email system for each email user. In specific implementations, for an MS Exchange server, one "Attachments" folder is provided for each email user. This folder would be visible to the user within the user's Outlook email client.

In some implementations, attachments of emails sent to the user's mobile device via the enterprise server 93 are automatically identified by the enterprise server 93 and placed by the enterprise server 93 in the "Attachments" folder. Alternatively, or in addition to, the user could on the mobile device identify the attachment and indicate that that attachment(s) should be placed in the "Attachments" folder. This command would be signalled over the wireless or wired communications link between the mobile device and the enterprise server 93. The enterprise server 93 would then obtain a copy of the attachment(s) and place the attachment(s) in the "Attachment" folder of the user. Only the signalling of the command would go over the link between the mobile device and the enterprise node and enterprise server 93. The user would be able to give such a command via the mobile device whether or not the email attachment was itself transmitted to the mobile device. Typically, the email and the identity [filename] of the attachment is visible to the user on the mobile device.

In some implementations, when the user has an instant messaging session in progress on the user's mobile device, the file(s) that the user's IM correspondent sends via the IM session would be identified by the IM server 94 at the enterprise node. The file would be stored on the IM server 94 in the user's folder, or preferably, in the "Attachments" folder on the electronic message server 92.

In some implementations, the user is able, from the user's PC, to add files to the "Attachments" folder. This would enable the user to add files that the user may later wish to send via email or instant messaging from the mobile device. In some implementations, the user sends a command from the mobile device and the files are not transmitted over the air.

Figure 18:
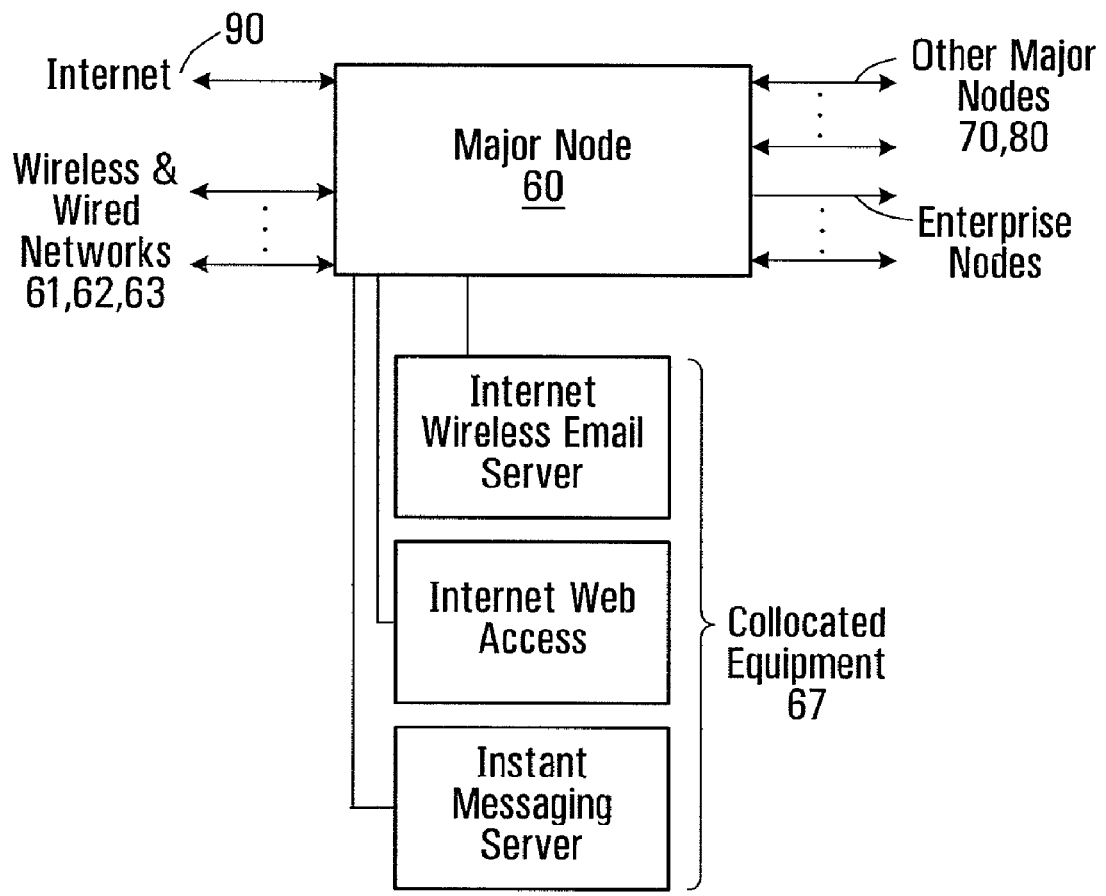
FIG. 18 is a schematic showing more detail of one of the major network nodes and collocated equipment shown in FIG. 15.

Referring now to FIG. 18, shown is a schematic showing more detail of one of the major network nodes and collocated equipment shown in FIG. 16. It is to be understood that the elements depicted in FIG. 18 are very specific for examplary purposes only. The major node 60 is a major communications hub interconnecting with the Internet 90, the wireless and wired networks 61,62,63, other major nodes 70,80, and enterprise nodes. The major node 60 also connects to collocated equipment 67, namely an Internet wireless email server, an Internet Web Access, and an Instant Messaging Server in this example. There may be other components, but they are not shown for sake of simplicity.

The links to the wireless and wired networks 61,62,63 in its sector are used for communication purposes. The links to the other major nodes are used for example so that roaming mobile units can connect from the service area that they are in to their normal 'home' major node. The connections to the collocated equipment 67 provide several functions for 'internet' [non-enterprise] service for mobile units, for example email service, 'Internet" (web) access, and instant messaging via an IM server. These non-enterprise mobile units, and the enterprise mobile units while they are utilizing non-enterprise (i.e. 'internet') services, are provided email service, internet access, and (for non-enterprise mobile units) instant messaging services.

In some implementations, in a manner similar to that described for enterprise mobile units, the non-enterprise mobile units have attachments maintained in an "Attachments" folder in the user's partition of the email server.

Numerous modifications and variations of the present application are possible in light of the above teachings. It is therefore to be understood that within the scope of the appended claims, the application may be practised otherwise than as specifically described herein.

I claim:

1. A method in a communications device, the communications device being in communication with a communications node, the method comprising:
   accepting user input for selecting at least one electronic file accessible by the communications node to be attached to a new electronic message being composed; and
   sending the new electronic message and an identification of the at least one electronic file, the identification enabling the communications node to identify and attach the at least one electronic file to the new electronic message.

2. The method of claim 1 wherein the at least one electronic file comprises a user-selected electronic message of a plurality of electronic messages.

3. The method of claim 2 further comprising:
receiving at least a portion of each of a plurality of electronic messages, each portion comprising a message identifier; and
using the message identifier of the user-selected electronic message in the identification of the at least one electronic file.

4. The method of claim 1 wherein the at least one electronic file comprises a user-selected attachment of a plurality of attachments in respect of a plurality of electronic messages.

5. The method of claim 4 further comprising:
receiving at least a portion of each of a plurality of electronic messages having attachments, each portion comprising an identifier for identifying attachments; and
using the identifier of the user-selected attachment in the identification of the at least one electronic file.

6. The method of claim 5 wherein the identifier comprises:
an attachment identifier for identifying the user-selected attachment; and
a message identifier for identifying the electronic message to which the user-selected attachment was attached.

7. A non-transitory computer readable medium having computer readable instructions stored thereon for execution on a communications device so as to implement the method of claim 1.

8. A communications device in communication with a communications node, the communications device comprising:
a user interface adapted to accept user input for selecting at least one electronic file accessible by the communications node to be attached to a new electronic message being composed; and
an electronic file identification function adapted to send the new electronic message and an identification of the at least one electronic file, the identification enabling the communications node to identify and attach the at least one electronic file to the new electronic message.

9. A method in a communications node, the communications node being in communication with a communications device, the method comprising:
receiving a new electronic message and an identification of at least one electronic file to be attached to the new electronic message;
identifying the at least one electronic file using the identification;
attaching the at least one electronic file to the new electronic message; and
transmitting the new electronic message to at least one recipient.

10. The method of claim 9 further comprising:
receiving a plurality of electronic messages addressed to the communications device;
storing a copy of each of the plurality of electronic messages in a repository that is accessible by the communications node; and
sending at least a portion of each of the plurality of electronic messages to the communications device, each portion comprising an identifier for identifying the electronic message and any respective attachments.

11. The method of claim 9 further comprising:
maintaining access to a repository for the at least one electronic file.

12. The method of claim 11 wherein the repository comprises at least one of: an electronic message application folder, a shared directory of an enterprise network, and an Internet.

13. A non-transitory computer readable medium having computer readable instructions stored thereon for execution on a communications node so as to implement the method of claim 9.

14. A communications node comprising:
an electronic file attachment function adapted to:
receive a new electronic message and an identification of at least one electronic file to be attached to the new electronic message;
identify the at least one electronic file using the identification;
attach the at least one electronic file to the new electronic message; and
transmit the new electronic message to at least one recipient.

15. A method in a communications device, the communications device being in communication with a communications node, the method comprising:
maintaining a communications session with another communications device;
accepting user input for selecting at least one electronic file accessible by the communications node, the at least one electronic file being selected for transmission in the communications session; and
sending an identification of the at least one electronic file, the identification enabling the communications node to identify and transmit the at least one electronic file in the communications session.

16. A non-transitory computer readable medium having computer readable instructions stored thereon for execution on a communications device so as to implement the method of claim 15.

17. A communications device comprising:
a communication session function adapted to maintain a communications session with another communications device;
a user interface adapted to accept user input for selecting at least one electronic file accessible by the communications node, the at least one electronic file being selected for transmission in the communications session; and
an electronic file identification function adapted to send an identification of the at least one electronic file, the identification enabling the communications node to identify and transmit the at least one electronic file in the communications session.

18. A method in a communications node, the communications node being in communication with a communications device, the method comprising:
receiving an identification of at least one electronic file to be transmitted in a communications session;
identifying the at least one electronic file using the identification; and
transmitting the at least one electronic file in the communications session.

19. A non-transitory computer readable medium having computer readable instructions stored thereon for execution on a communications node so as to implement the method of claim 18.

20. A communications node comprising:
an electronic file transmission function adapted to:
receive an identification of at least one electronic file to be transmitted in a communications session;
identify the at least one electronic file using the identification; and
transmit the at least one electronic file in the communications session.

* * * * *

UNITED STATES PATENT AND TRADEMARK OFFICE
CERTIFICATE OF CORRECTION

PATENT NO.         : 7,986,943 B2                            Page 1 of 1
APPLICATION NO.    : 12/875405
DATED              : July 26, 2011
INVENTOR(S)        : George Baldwin Bumiller It is certified that error appears in the above-identified patent and that said Letters Patent is hereby corrected as shown below:

Column 12, lines 43-44, "In some implementations the menu..." should read -- In some implementations, the menu... --

Column 13, line 2, "...in a manner that visually separate..." should read -- ...in a manner that visually separates... --

Signed and Sealed this
Eighteenth Day of October, 2011

David J. Kappos
*Director of the United States Patent and Trademark Office*